(12) United States Patent
Rosenberger et al.

(10) Patent No.: US 12,189,177 B2
(45) Date of Patent: Jan. 7, 2025

(54) METHODS FOR PRODUCING A HOLLOW-CORE FIBER AND FOR PRODUCING A PREFORM FOR A HOLLOW-CORE FIBER

(71) Applicant: HERAEUS QUARZGLAS GMBH & CO. KG, Hanau (DE)

(72) Inventors: Manuel Rosenberger, Hanau (DE); Martin Trommer, Hanau (DE); Steffen Weimann, Hanau (DE); Michael Hünermann, Hanau (DE); Kay Schuster, Hanau (DE)

(73) Assignee: HERAEUS QUARZGLAS GMBH & CO. KG, Hanau (DE)

( * ) Notice: Subject to any disclaimer, the term of this patent is extended or adjusted under 35 U.S.C. 154(b) by 403 days.

(21) Appl. No.: 17/619,980

(22) PCT Filed: Jul. 15, 2020

(86) PCT No.: PCT/EP2020/069992
§ 371 (c)(1),
(2) Date: Dec. 16, 2021

(87) PCT Pub. No.: WO2021/009220
PCT Pub. Date: Jan. 21, 2021

(65) Prior Publication Data
US 2022/0357506 A1    Nov. 10, 2022

(30) Foreign Application Priority Data
Jul. 17, 2019  (EP) .................................... 19186861

(51) Int. Cl.
*G02B 6/02* (2006.01)
*C03B 37/012* (2006.01)
(Continued)

(52) U.S. Cl.
CPC .... *G02B 6/02328* (2013.01); *C03B 37/01245* (2013.01); *C03B 37/01262* (2013.01);
(Continued)

(58) Field of Classification Search
CPC ....... G02B 6/02328; G02B 6/032; G02B 6/02
See application file for complete search history.

(56) References Cited

U.S. PATENT DOCUMENTS

| 7,346,250 B1 * | 3/2008 | Dabich, II | C03B 37/01228 385/115 |
| 2003/0056550 A1 * | 3/2003 | Tanaka | C03B 37/0122 65/435 |

(Continued)

FOREIGN PATENT DOCUMENTS

| DE | 10044804 A1 * | 12/2001 | ............. B29C 71/04 |
| DE | 102004054392 A1 | 3/2006 | |

(Continued)

OTHER PUBLICATIONS

Nawazuddin, "Lotus-Shaped Negative Curvature Hollow Core Fiber with 10.5 dB/km at 1550 nm Wavelength", Mar. 1, 2018, Journal of Lightwave Technology, vol. 36, No. 5, 1213-1219 (Year: 2018).*

(Continued)

*Primary Examiner* — Alison L Hindenlang
*Assistant Examiner* — Steven S Lee
(74) *Attorney, Agent, or Firm* — Panitch Schwarze Belisario & Nadel LLP

(57) ABSTRACT

Methods are known for producing an anti-resonant hollow-core fiber which has a hollow core extending along a fiber longitudinal axis and an inner jacket region that surrounds the hollow core, said jacket region comprising multiple anti-resonant elements. The known methods have the steps of: providing a cladding tube that has a cladding tube inner bore and a cladding tube longitudinal axis along which a (Continued)

cladding tube wall extends that is delimited by an interior and an exterior; providing a number of tubular anti-resonant element preforms; arranging the anti-resonant element preforms at target positions of the interior of the cladding tube wall, thereby forming a primary preform which has a hollow core region and an inner jacket region; and further processing the primary preform in order to form a secondary preform, including a process of elongating the primary preform in order to directly form the hollow-core fiber or to form the secondary preform. The aim of the invention is to achieve a high degree of precision and an exact positioning of the anti-resonant elements in a sufficiently stable and reproducible manner on the basis of the aforementioned methods. This is achieved in that a primary preform with an outer diameter ranging from 20 to 70 mm is used for the elongation process.

15 Claims, 1 Drawing Sheet

(51) Int. Cl.
   C03B 37/027       (2006.01)
   G02B 6/032        (2006.01)
(52) U.S. Cl.
   CPC ........ *C03B 37/02781* (2013.01); *G02B 6/032* (2013.01); *C03B 2201/02* (2013.01); *C03B 2203/16* (2013.01)

(56) References Cited

U.S. PATENT DOCUMENTS

| | | | |
|---|---|---|---|
| 2003/0172682 A1 | 9/2003 | Sato et al. | |
| 2003/0230118 A1* | 12/2003 | Dawes ................ | C03B 37/0122 65/393 |
| 2004/0096173 A1 | 5/2004 | Fekety et al. | |
| 2004/0179796 A1* | 9/2004 | Jakobsen .......... | C03B 37/01234 385/123 |
| 2005/0226578 A1* | 10/2005 | Mangan ............. | G02B 6/02347 385/125 |
| 2006/0046075 A1 | 3/2006 | Maul et al. | |
| 2006/0130528 A1 | 6/2006 | Nelson et al. | |
| 2008/0278710 A1* | 11/2008 | Schmidt ................. | G04F 5/145 356/73 |
| 2008/0310806 A1 | 12/2008 | Mukasa | |
| 2009/0019893 A1 | 1/2009 | Bogdahn | |
| 2010/0104869 A1* | 4/2010 | Borrelli ................ | C03C 13/046 65/437 |
| 2015/0274577 A1* | 10/2015 | Nakanishi ......... | C03B 37/02754 65/378 |
| 2018/0145752 A1* | 5/2018 | Ma ........................ | G01B 11/08 |
| 2018/0267235 A1* | 9/2018 | Russell ............. | C03B 37/02781 |
| 2019/0322566 A1* | 10/2019 | Drachenberg .......... | C03B 37/03 |

FOREIGN PATENT DOCUMENTS

| | | | | |
|---|---|---|---|---|
| DE | 102005028219 B3 | | 10/2006 | |
| DE | 102014011041 A1 | * | 1/2016 | ............. G01N 21/05 |
| EP | 3136143 A1 | | 3/2017 | |
| GB | 2566466 A | | 3/2019 | |
| JP | 2004115286 A | | 4/2004 | |
| JP | 2005145765 A | | 6/2005 | |
| JP | 2018150184 A | * | 9/2018 | |
| WO | 02/072489 A2 | | 9/2002 | |
| WO | WO-2018169487 A1 | * | 9/2018 | ......... C03B 37/0122 |
| WO | WO-2019008352 A1 | * | 1/2019 | ........... C03B 23/207 |
| WO | WO-2019053412 A1 | * | 3/2019 | ....... C03B 37/01208 |

OTHER PUBLICATIONS

Edavalath, "design and fabrication of effectively single mode hollow-core single-ring photonic crystal fibres", Oct. 8, 2018, Max Planck Institute for Science of Light, Doctoral thesis of Nitin N. Edavalath (Year: 2018).*
International Search Report and Written Opinion mailed Sep. 16, 2020 by the European Patent Office in its capacity as International Searching Authority for counterpart international patent application No. PCT/EP2020/069992 (with English translations attached).
Jasion, Gregory T. et al, "Fabrication of tubular anti-resonant hollow core fibers: modelling, draw dynamics and process optimization" Optics Express vol. 27, No. 15, pp. 20567-20582, Jul. 2019 (DOI: 10.1364/OE.27.020567).
Kosolapov, A.F. et al, "Hollow-core revolver fibre with a double-capillary reflective cladding" Quantum Electronics 46 (3) Mar. 29, 2016 pp. 267-270 (DOI: 10.1070/QEL15972).
Nawazuddin, M.B.S. et al., "Lotus Shaped Negative Curvature Hollow Core Fibre with 10.5 dB/km at 1550 nm Wavelength" 2017 European Conference on Optical Communication (ECOC), IEEE, (2017) pp. 1-3 (DOI: 10.1109/ECOC.2017.8346101).
Poletti, Francesco "Nested antiresonant nodeless hollow core fiber," Optics Express, vol. 22, No. 20 (2014) pp. 23807-23828 (DOI:10.1364/OE 22.023807).
Sherlock, Ben et al., "Tunable fibre-coupled multiphoton microscopy with a negative curvature fibre" Journal of Biophotonics, vol. 9, No. 7, pp. 715-720, (2016) (DOI: 10.1002/jbio.201500290).
Yu, Fei, "Chapter 4—Fabrication of hollow core negative curvature fibre" IN "Hollow core negative curvature fibres" University of Bath PhD. pp. 59-74, Dec. 31, 2013 (XP055656461).

* cited by examiner

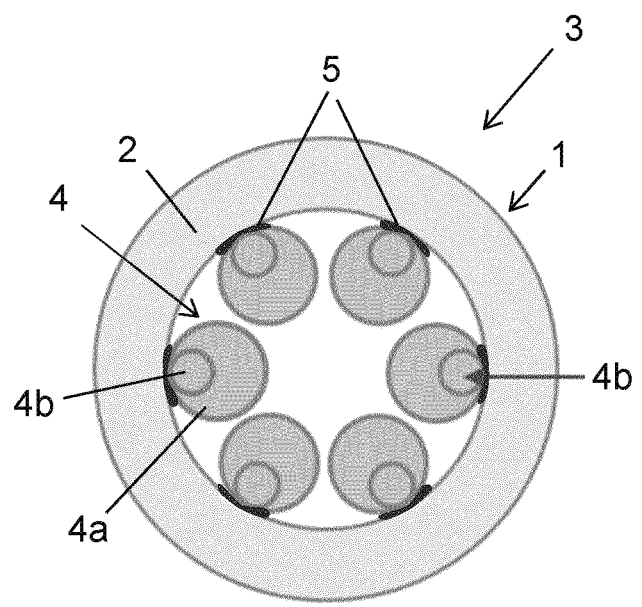

METHODS FOR PRODUCING A HOLLOW-CORE FIBER AND FOR PRODUCING A PREFORM FOR A HOLLOW-CORE FIBER

TECHNICAL BACKGROUND

The invention relates to a method for producing an anti-resonant hollow-core fiber comprising a hollow core extending along a longitudinal axis of the fiber and a sheath region surrounding the hollow core, which sheath region comprises a plurality of anti-resonance elements, comprising the method steps of:
(a) providing a cladding tube comprising an inner bore of the cladding tube and a longitudinal axis of the cladding tube along which a cladding tube wall delimited by an inner side and an outer side extends,
(b) providing a number of tubular anti-resonance element preforms,
(c) arranging the anti-resonance element preforms at desired positions of the inner side of the cladding tube wall to form a primary preform, which comprises a hollow core region and an inner sheath region,
(d) further processing the primary preform into a secondary preform from which the hollow-core fiber is drawn, wherein the further processing comprises an elongation and, optionally, a single or repeated performance of one or more of the following hot-forming processes:
 (i) collapse,
 (ii) collapse and simultaneous elongation,
 (iii) collapse of additional sheath material,
 (iv) collapse of additional sheath material and subsequent elongation,
 (v) collapse of additional sheath material and simultaneous elongation, and
(e) drawing the secondary preform to form the hollow-core fiber, The invention also relates to a method for producing a preform for an anti-resonant hollow-core fiber comprising a hollow core extending along a longitudinal axis of the fiber and a sheath region surrounding the hollow core, which sheath region comprises a plurality of anti-resonance elements, comprising the method steps of:
(a) providing a cladding tube comprising an inner bore of the cladding tube and a longitudinal axis of the cladding tube along which a cladding tube wall delimited by an inner side and an outer side extends,
(b) providing a number of tubular anti-resonance element preforms,
(c) arranging the anti-resonance element preforms at desired positions of the inner side of the cladding tube wall to form a primary preform, which comprises a hollow core region and an inner sheath region, and
(d) further processing the primary preform into a secondary preform for the hollow-core fiber, wherein the further processing comprises an elongation and optionally a single or repeated performance of one or more of the following hot-forming processes:
 (i) collapse,
 (ii) collapse and simultaneous elongation,
 (iii) collapse of additional sheath material,
 (iv) collapse of additional sheath material and subsequent elongation,
 (v) collapse of additional sheath material and simultaneous elongation.

Conventional single-mode optical fibers made of solid material have a core region made of glass, which is surrounded by a sheath region made of glass with a lower refractive index. Light guidance is based thereby on total reflection between the core and the sheath region. However, the interactions of the guided light with the solid material are associated with an increased latency in data transmission and relatively low damage thresholds with respect to high-energy radiation.

These disadvantages are prevented or reduced by "hollow-core fibers" in which the core comprises an evacuated cavity filled with gas or liquid. In hollow-core fibers, the interaction of the light with the glass is less than in solid core fibers. The refractive index of the core is less than that of the sheath, so that light guidance by total reflection is not possible and the light would normally escape from the core into the sheath. As a function of the physical mechanism of the light guidance, hollow-core fibers are divided into "photonic bandgap fibers" and "anti-resonance reflection fibers."

In the case of "photonic bandgap fibers," the hollow core region is surrounded by a sheath in which small hollow channels are arranged periodically. On the basis of semiconductor technology, the periodic structure of the hollow channels in the sheath brings about the effect referred to as the "photonic bandgap," according to which light of certain wavelength ranges scattered at the sheath structures can constructively interfere due to Bragg reflection in the central cavity and cannot propagate transversely in the sheath.

In the embodiment of the hollow-core fiber referred to as "anti-resonant hollow-core fiber" (ARHCF), the hollow core region is surrounded by an inner sheath region in which so-called "anti-resonant elements" (or "anti-resonance elements," "AREs" for short) are arranged. The walls of the anti-resonance elements evenly distributed around the hollow core can act as Fabry-Perot cavities operated in anti-resonance, which reflect the incident light and guide it through the fiber core.

This fiber technology promises a low optical attenuation, a very broad transmission spectrum (even in the UV or IR wavelength ranges) and a low latency in data transmission.

Potential applications of the hollow-core fibers lie in the fields of data transmission, high-power beam guidance, for example for material processing, modal filtering, non-linear optics, in particular for super-continuum generation, from the ultraviolet to infrared wavelength range.

PRIOR ART

A disadvantage of anti-resonant hollow-core fibers is that higher-order modes are not necessarily suppressed, so that they are often not exclusively single-mode over long transmission lengths and the quality of the output beam deteriorates.

In the paper by Francesco Poletti "Nested antiresonant nodeless hollow core fiber," Optics Express, vol. 22, no. 20 (2014), DOI: 10.1364/OE 22.023807, a fiber design is proposed, with which anti-resonance elements are not designed as a simple singular structural element, but are composed of several nested structural elements. The nested anti-resonance elements are designed such that higher-order core modes, but not the fundamental core mode, are phase-matched to the sheath modes and are suppressed. As a result, the propagation of the fundamental core mode is always ensured, and the hollow-core fiber can be effectively single-mode over a limited wavelength range.

Effective mode suppression depends on the center wavelength of the transmitted light and on the structural parameters of the fiber design, such as the radius of the hollow core and the difference in the diameters of nested ring structures in the anti-resonance elements.

EP 3 136 143 A1 discloses an anti-resonant hollow-core fiber (referred to therein as "hollow-core fiber of non-bandgap type"), with which the core can conduct further modes in addition to the fundamental mode. For this purpose, it is surrounded by an inner sheath having "non-resonant elements," which provide a phase-matching of anti-resonant modes with the higher modes. The hollow-core fiber is produced according to what is known as a "stack-and-draw technique", by arranging the starting elements to form an axially parallel ensemble and fixing them to form a preform and then elongating the preform. In this case, a cladding tube with a hexagonal inner cross-section is used, and six so-called "ARE preforms" (anti-resonance element preforms) are fixed in the inner edges of the cladding tube. This preform is drawn in two stages to form a hollow-core fiber.

WO 2018/169487 A1 discloses a method for producing a preform for anti-resonant hollow-core fibers, with which a first sheath region comprises a plurality of rods and a second sheath region comprises a plurality of tubes surrounded by an outer cladding tube. Rods, tubes, and cladding tube are joined to form a preform by means of the "stack and draw" technique. Before the preform is elongated, the preform end is sealed, which is done by applying a sealing compound. For example, a UV adhesive is used as the sealing compound.

Technical Object

Anti-resonant hollow-core fibers, and in particular those with nested structural elements, have complex internal geometries, which makes it difficult for them to be produced exactly and reproducibly. This applies all the more because, if the resonance or anti-resonance conditions are to be maintained, even small variations in dimensions in the order of magnitude of the operating wavelength of the light to be guided cannot be tolerated. Deviations from the desired geometry can be caused by the configuration of the fiber preform, and they can also occur through undesired deformations that are not true to scale in the fiber drawing process.

In the known "stack and draw" technique, many elements are to be joined together with positional accuracy. For example, in the "NANF" design, six anti-resonance element preforms, each consisting of an anti-resonance preform outer tube (ARE outer tube), and an anti-resonance preform inner tube (ARE-inner tube) welded on one side to the inner sheath surface of the ARE outer tube must be attached to the inside of a sheath tube in order to produce the hollow-core fiber known from the paper mentioned at the outset.

In order to achieve low attenuation values and broad transmission ranges, the azimuthal position of the anti-resonance elements within the cladding tube is also important in addition to a uniform wall thickness of the walls of the anti-resonance elements. This cannot be easily achieved with the "stack and draw" technique. The aim of the invention is to specify a method for the cost-effective production of an anti-resonant hollow-core fiber that avoids the limitations of conventional production methods.

In particular, it is the object of the invention to provide a method for producing an anti-resonant hollow-core fiber and a preform for anti-resonant hollow-core fibers, with which a high precision of the structural elements and an exact positioning of the anti-resonance elements in the fiber can be reproducibly achieved in a sufficiently stable and reproducible manner.

Moreover, disadvantages of the classic "stack and draw" technique, with which the required structural accuracies, in particular a uniform wall thickness of the anti-resonance elements and exact positioning at predetermined azimuthal positions, is not easy to achieve, are to be avoided if at all possible.

SUMMARY OF THE INVENTION

With regard to the method for producing the anti-resonant hollow-core fiber, this object is achieved according to the invention starting from a method of the genus mentioned at the outset in that a primary preform is used during elongation, which primary preform has an outer diameter in the range of 20 to 70 mm.

The starting point for producing the anti-resonant hollow-core fiber is a preform referred to herein as a "primary preform." It comprises a cladding tube in which or on which precursors or preforms for the shaping of anti-resonant elements are contained in the hollow-core fibers (referred to here as "anti-resonance elements" for short). The primary preform can be elongated to form the hollow-core fiber; however, as a rule, the primary preform is further processed to produce therefrom a preform referred to herein as a "secondary preform." Optionally, the hollow-core fiber is produced by elongating the secondary preform. Alternatively, the primary preform or the secondary preform are surrounded by a collecting cylinder or a plurality of collecting cylinders to form a coaxial ensemble of components, and the coaxial ensemble is elongated directly to form the hollow-core fiber. The general term "preform" is understood here to mean that component or that coaxial ensemble of components from which the hollow-core fiber is ultimately drawn.

The addition of sheath material is accomplished, for example, by collapsing a collecting cylinder onto the primary preform. The coaxial arrangement of primary preform and collecting cylinder is elongated or is not elongated when the collecting cylinder collapses. The anti-resonance element preforms here are changed in their shape or arrangement, or they are not changed in their shape or arrangement.

The production of the preform comprises a number of method steps, with which starting elements of the hollow-core fiber are produced and positioned relative to one another, and at least one heat deformation step. Each of the starting elements has a certain deviation from its desired geometry, and each step of positioning and forming inevitably leads to geometry deviations that add up into an absolute geometry error in the finished preform. In particular, the hot forming of glass can lead to an undesired and non-reproducible deformation when there are even minimal deviations from an ideal, generally cylindrically symmetrical temperature profile of the heating zone.

The primary preform used in the method according to the invention for the purpose of elongation—optionally with simultaneous collapsing of additional sheath material—is characterized by a diameter in the range of 20 to 70 mm, preferably by an outer diameter in the range of 30 to 70 mm. This is a comparatively large outer diameter. In the prior art, the outer diameters of the secondary preforms (canes) are typically 4 to 6 mm. The production of hollow-core fibers on an industrial scale is thus hardly possible.

Since the absolute geometry errors present during fiber drawing are scaled down more strongly as the diameter of the preform increases, a more precise production of the hollow-core fiber is thus made possible in principle.

However, it has been found that a random increase in the diameter of the primary preform does not automatically lead to a more precise hollow-core fiber, but rather that the following boundary conditions are to be observed in order to maintain a maximum relative geometry error of 3.5% in the wall thickness of the hollow-core fiber.

I. The diameter of the primary preform is at most 70 mm. The larger the diameter, the slower the tracking speed during elongation and the longer the duration that each axial section of the preform is exposed to the high temperature of the heating zone. However, at too slow a tracking speed during elongation, the structural elements of the anti-resonance element preforms deform.

II. The diameter of the primary preform is at least 20 mm. With smaller diameters, it has been found the thermal inertia of the preform is too low to compensate for any temperature fluctuations in the heating zone. With decreasing preform diameter, the advantage of reducing any absolute error through elongating also decreases.

The hollow core region and the material for the inner sheath region of the secondary preform are predetermined by the primary preform. This comprises the hollow core and an inner sheath region. An enlargement of the outer diameter of the primary preform can be achieved both by an enlargement of the hollow core (concomitant with less attenuation) and by a reduction of the outer diameter of the final hollow-core fiber (concomitant with less material input). An outer diameter of the inner sheath region of the secondary preform in the range of 7 mm to 50 mm, preferably in the range of between 20 and 50 mm, represents a suitable compromise.

During elongation, the primary preform is continuously supplied to a heating zone at a feed rate, softens zonally in the heating zone, and is removed from the heating zone at a removal rate. The forming process preferably takes place without contact between the soft gas and a molding tool, and particularly preferably in a vertical drawing process.

The temperature of the heating zone during the hot-forming process should be as constant as possible. In the hot-forming process according to method step (d), a temperature-controlled heating element is therefore advantageously used, the desired temperature of which is kept precisely at +/−0.1° C.

Temperature fluctuations in the hot-forming process can thereby be limited to less than +/−0.5° C.

If the feed rate is too high, temperature gradients can occur in the primary preform, which can result in the anti-resonance element preforms distributed therein at different radial positions exhibiting different elongation behavior. A feed rate that is too low can lead to undesired deformations of the anti-resonance element preforms. A suitable compromise has proven to be feeding the primary preform to a heating zone during elongation, wherein the feed rate is set so as to yield a throughput of at least 0.8 g/min, preferably a throughput in the range of 0.8 g/min to 85 g/min, and particularly preferably a throughput in the range of 3.3 g/min to 85 g/min, and an average dwell time in the heating zone of less than 25 min, preferably an average dwell time in the range of 5 to 25 min.

In order to reduce absolute geometry errors, a large draw-down ratio during elongation is desired. On the other hand, a large draw-down ratio is associated with correspondingly large forming processes and material movements, which can easily lead to undesired deformations in the intricate structural elements of the anti-resonance element preforms.

As a suitable compromise, it has proven to be advantageous if the draw-down ratio during elongation is set to a value in the range of 1.05 to 10, preferably to a value in the range of 1.05 to 5.

In a preferred method variant, the arrangement of the anti-resonance element preforms and/or the elongation of the primary preform and/or the drawing of the hollow-core fiber comprises a fixing measure and/or a sealing measure using a sealing or bonding compound containing amorphous $SiO_2$ particles.

The sealing or bonding compound used for sealing or fixing contains amorphous $SiO_2$ particles, which are held, for example, in a dispersion liquid. This compound is applied between the surfaces to be bonded or sealed and is generally pasty during use. When dried at low temperature, the dispersion liquid is partially or completely removed and the compound solidified. The sealing or bonding compound, and, in particular, the solidified $SiO_2$-containing sealing or bonding compound obtained after drying, satisfies the requirements for fixing and compacting. The temperature required for drying is below 300° C., which facilitates compliance with the dimensional stability of the preform and avoids thermal impairments. Heating to higher temperatures around 800° C., for example during elongation of the preform to form the hollow-core fiber, results in further thermal solidification of the sealing or bonding compound, which is also suitable for forming opaque or transparent glass. This is done by sintering or vitrifying, wherein sintering to form opaque glass requires comparatively lower temperatures and/or short heating durations than vitrifying to complete transparency. The sealing or bonding compound can thus be completely compacted by heating and vitrified by heating in the hot-forming process. The sealing or bonding compound behaves like quartz glass; it becomes viscous and deformable.

In the hot-forming process, the sealing or bonding compound does not decompose and releases few impurities. It is thus characterized by thermal stability and purity in the hot-forming process and avoids deformations resulting from different thermal coefficients of expansion.

The sealing and bonding compound may also advantageously be used to seal open ends of the anti-resonance element preforms and/or individual structural elements of the anti-resonance element preforms and/or any annular gap between tube elements when the primary preform is elongated and/or when the hollow-core fiber is drawn.

In this way, the individual components of the primary preform and/or secondary preform may be subjected to different internal pressures during elongation or during the fiber-drawing process.

In the case of anti-resonance element preforms that each have at least one ARE outer tube and/or at least one ARE inner tube, the accuracy of the positioning of the preforms on the inner sheath surface of the cladding tube is further improved by the inner side of the cladding tube and/or the outer side of the cladding tube and/or the inner side of the ARE outer tube and/or the outer side of the ARE outer tube being produced by machining, in particular by drilling, milling, grinding, honing and/or polishing.

In comparison to other known forming techniques, said machining techniques provide more precise and finer structures by using heat and pressure, and they avoid contamination of surfaces by molding tools, such as nozzles, presses or fusion molds.

The machining preferably also comprises a structuring of the inner side of the cladding tube in the region of desired positions of the anti-resonance element preforms by providing it with a longitudinal structure extending in the direction of the longitudinal axis of the cladding tube. This longitudinal structure comprises, for example, longitudinal slots and/or longitudinal grooves in the inner side of the cladding tube, which run parallel to the longitudinal axis of the cladding tube and which are preferably produced by drilling, sawing, milling cutting or grinding.

The longitudinal structure extending in the direction of the longitudinal axis of the cladding tube serves as a positioning aid for the anti-resonance element preforms. It makes it easier for the anti-resonance element preforms to assume predetermined defined positions on the inner side of the cladding tube.

The accuracy of the positioning of the preforms on the inner side of the cladding tube is improved if the upper face ends of the structural elements are positioned at the desired position by means of a positioning template.

The positioning template has, for example, a shaft projecting into the inner bore of the cladding tube, which shaft is provided with holding elements in the form of a plurality of holding arms facing radially outwards.

The structurally predetermined star-shaped arrangement of the holding elements facilitates the exact positioning of the anti-resonance element preforms at the respective desired positions and their fixing, for example by means of the sealing or bonding compound explained above. In this case, the positioning template is preferably used exclusively in the region of the end faces of the cladding tube, preferably in the region of both cladding tube end faces.

A method has also proven effective with which, when the primary preform is elongated according to method step (d) and/or when the hollow-core fiber is drawn according to method step (e), a plurality of components of the preform made of quartz glass are heated together and softened, wherein the quartz glass of at least some of the preform components contains at least one dopant that lowers the viscosity of quartz glass.

Components of the primary preform include the cladding tube and the anti-resonance element preforms arranged therein. The secondary preform contains additional sheath material that is provided, for example, in the form of a collecting cylinder or a plurality of collecting cylinders and collapses onto the primary preform.

Dopants used to lower the viscosity of quartz glass are preferably fluorine, chlorine and/or hydroxyl groups.

The doping makes it possible to adapt the thermal expansion coefficients of adjacent preform components in order to avoid or reduce stresses. It can also be used to reduce the thermal stability of a component to favor the stability of an adjacent component.

For example, it has proven to be advantageous if, at a measuring temperature of 1250° C., the quartz glass of the cladding tube has a viscosity at least 0.5 dPa·s higher, preferably a viscosity at least 0.6 dPa·s higher, than the quartz glass of additionally applied sheath material (if the viscosity is given as a logarithmic value in dPa·s).

In particular with regard to a low optical attenuation and a large optical transmission bandwidth of the hollow-core fiber, it has proven to be particularly advantageous for the anti-resonance elements to be arranged around the hollow core with an odd-numbered symmetry.

In a preferred method, the accuracy of the positioning of the preforms in the cladding tube is further improved in that tubular structural elements are provided, of which at least some have a wall thickness in the range of 0.2 and 2 mm, preferably a wall thickness in the range of 0.25 and 1 mm, and wherein a cladding tube with an external diameter in the range of 90 and 250 mm, and preferably with an external diameter in the range of 120 to 200 mm, is provided. These components each have a length of at least 1 m. They are relatively high-volume structural elements for forming anti-resonance elements. This simplifies handling. In addition, with a vertical arrangement of cladding tube and structural elements, gravitational force supports the parallelism and vertical alignment of the longitudinal axes of the structural elements when the structural elements are each positioned and fixed in the desired position at their upper face end; for example and preferably using the sealing or bonding compound explained in more detail above and, additionally or alternatively thereto, by means of the positioning template described in detail above.

With regard to the production of the preform for the hollow-core fiber, the aforementioned technical object is achieved according to the invention starting from a method of the genus mentioned at the outset in that a primary preform is used during elongation which has an outer diameter in the range of 20 to 70 mm, preferably in the range of 30 to 70 mm, and in that during elongation the primary preform is continuously supplied to a heating zone at a feed rate, softens zonally in the heating zone, and is removed from the heating zone at a removal rate.

The primary preform is used to produce an intermediate product in the form of a secondary preform for the anti-resonant hollow-core fiber. A primary preform is produced, which has a large diameter compared to the prior art, so that the absolute geometry error present in the primary preform can be scaled down more strongly during elongation.

This method enables a more precise production of the hollow-core fiber. Measures for producing the preform are explained above in connection with the production of the hollow-core fiber, and these explanations are included herewith.

Definitions

Individual method steps and terms of the above description are additionally defined below. The definitions form part of the description of the invention. That which is expressed in the description is definitive in the event of a factual contradiction between one of the following definitions and the remaining description.

Anti-Resonance Elements

The anti-resonance elements may be simple or nested structural elements of the hollow-core fiber. They have at least two walls that, when viewed from the direction of the hollow core, have a negative curvature (convex) or do not have a curvature (planar, straight). They generally consist of a material that is transparent to the working light, for example glass, in particular doped or undoped $SiO_2$, a plastic, in particular a polymer, a composite material or crystalline material.

Anti-Resonance Element Preform/Anti-Resonance Element Precursor

What are referred to as anti-resonance element preforms are components or constituents of the preform that essentially become anti-resonance elements in the hollow-core fiber by simple elongation during the fiber-drawing process. Components or constituents of the preform that become anti-resonance element preforms only upon forming or that become anti-resonance elements directly are referred to as anti-resonance element precursors. The anti-resonance element preforms may be simple or nested components to which additional positioning aids can be fixed. They are originally present in the primary preform.

Nested anti-resonance element preforms form nested anti-resonance elements in the hollow-core fiber. They are composed of an outer tube and at least one further structural element that is arranged in the inner bore of the outer tube. The further structural element can be a further tube which bears against the inner sheath surface of the outer tube. The outer tube is referred to as an "anti-resonance element outer tube" or an "ARE outer tube" for short, and the further tube is referred to as an "anti-resonance element inner tube" or an "ARE inner tube" for short, or also as a "nested ARE inner tube."

In the case of multi-nested anti-resonance element preforms, at least one further structural element, for example a third tube abutting against the inner sheath surface of the nested ARE inner tube, can be arranged in the inner bore of the nested ARE inner tube. Where there are multi-nested anti-resonance element preforms, in order to distinguish between the multiple tubes that are arranged within the ARE outer tube, a distinction can optionally be made between "outer nested ARE inner tube" and "inner nested ARE inner tube."

The term "cross-section" in conjunction with cylindrical anti-resonance element preforms and their cylindrical structural elements always refers to the cross-section perpendicular to the respective longitudinal axis of the cylinder, namely, unless otherwise indicated, the cross-section of the outer contour in tubular components (not the cross-section of the inner contour).

Further processing of the primary preform, in particular by hot-forming steps, can result in intermediate products, in which the original anti-resonance element preforms are present in a shape that has been modified compared to the original shape. The modified shape is also referred to herein as an anti-resonance element preform or as an anti-resonance element precursor.

Preform/Primary Preform/Secondary Preform/Core Preform (Cane)

The preform is the component from which the anti-resonant hollow-core fiber is drawn. It is a primary preform or a secondary preform produced by further processing of the primary preform. The primary preform can be present as an ensemble consisting of at least one cladding tube and preforms or precursors for anti-resonance elements that are loosely accommodated or firmly fixed therein. The further processing of the primary preform into a secondary preform from which the hollow-core fiber is drawn can comprise a single or repeated performance of one or more of the following hot-forming processes:
(i) elongation,
(ii) collapse,
(iii) collapse and simultaneous elongation,
(iv) collapse of additional sheath material,
(v) collapse of additional sheath material and subsequent elongation,
(vi) collapse of additional sheath material and simultaneous elongation.

A preform obtained by collapsing and/or elongating a primary preform is referred to in the literature as a cane. Typically, it is overlaid with additional sheath material before or during drawing of the hollow-core fiber.

Elongating/Collapsing

During elongation, the primary preform is lengthened. The lengthening can take place without simultaneous collapse. Elongation can take place true to scale, so that, for example, the shape and arrangement of components or constituents of the primary preform is reflected in the elongated end product. During elongation, however, the primary preform can also be drawn not true to scale and its geometry can be modified.

During collapse, an inner bore is narrowed or annular gaps between tubular components are closed or narrowed. Collapse is generally accompanied by elongation.

Hollow Core/Inner Sheath Region/Outer Sheath Region

The ensemble comprising at least one cladding tube and therein loosely accommodated or firmly fixed preforms or precursors for anti-resonance elements is also referred to herein as "primary preform." The primary preform comprises the hollow core and a sheath region. This sheath region is also referred to as an "inner sheath region" if there is also an "outer sheath region" that has been produced, for example, by collapsing onto the ensemble, and if a distinction is to be made between said sheath regions. The terms "inner sheath region" and "outer sheath region" are also used for the corresponding regions in the hollow-core fiber or in intermediate products obtained by further processing of the primary preform.

The designation "inner side of the tube" is also used as a synonym for "inner sheath surface of the tube" and the designation "outer side of the tube" is also used as a synonym for "outer sheath surface of the tube." The term "inner bore" in conjunction with a tube does not mean that the inner bore has been produced by a drilling process.

Machining

This refers to separating mechanical manufacturing methods for the separating processing of a workpiece, in particular turning, cutting, drilling, sawing, milling and grinding. This machining creates a longitudinal structure extending in the direction of the longitudinal axis of the cladding tube, which serves as a positioning aid for the anti-resonance element preforms. The longitudinal structure is accessible from the inner side of the cladding tube; it can also extend through the entire cladding tube wall to the outer side.

Particle Size and Particle Size Distribution

Particle size and particle size distribution of the $SiO_2$ particles are characterized using the $D_{50}$ values. These values are taken from particle size distribution curves showing the cumulative volume of $SiO_2$ particles as a function of the particle size. The particle size distributions are often characterized on the basis of the respective $D_{10}$, $D_{50}$ and $D_{90}$ values. In this case, the $D_{10}$ value characterizes the particle size that is not achieved by 10% of the cumulative volume of the $SiO_2$ particles, and accordingly, the $D_{50}$ value and the $D_{90}$ value characterize the particle sizes that are not achieved by 50% and by 90%, respectively, of the cumulative volume of the $SiO_2$ particles. The particle size distribution is determined by scattered light and laser diffraction spectroscopy according to ISO 13320.

EXEMPLARY EMBODIMENT

The invention is explained in more detail below with reference to an exemplary embodiment and a drawing. The following are shown in schematic representation FIG. 1 a primary preform with a cladding tube and anti-resonance element preforms positioned and fixed therein for producing a preform for a hollow-core fiber based on a view of the cross-section.

In the production of the hollow-core fiber or the preform for the hollow-core fiber, a plurality of components are to be connected together. In addition, it can be helpful to seal existing gaps or channels of the preform when carrying out hot-forming processes. For bonding or sealing, a sealing or bonding compound based on SiO$_2$ and as disclosed in DE 10 2004 054 392 A1 is used. In this case, an aqueous slip containing amorphous SiO$_2$ particles having a particle size distribution characterized by a D$_{50}$ value of about 5 µm and by a D$_{90}$ value of about 23 µm is produced by wet milling silica glass grain. Further amorphous SiO$_2$ grains with an average grain size of about 5 µm are mixed with the base slip. The slip used as a bonding compound has a solid content of 90%, which consists of at least 99.9 wt. % SiO$_2$.

FIG. 1 schematically shows a primary preform 3 with a cladding tube 1 having a cladding tube wall 2, on the inner sheath surface of which are fixed, at a uniform distance, anti-resonance element preforms 4 at previously defined azimuthal positions; in the exemplary embodiment, there are six preforms 4; in another preferred embodiment (not shown), there is an odd number of preforms.

The inner cladding tube 1 consists of quartz glass and has a length of 1000 mm, an outer diameter of 27 mm and an inner diameter of 20 mm. The anti-resonance element preforms 4 are present as an ensemble of nested structural elements consisting of an ARE outer tube 4a and an ARE inner tube 4b. The ARE outer tube 4a has an outer diameter of 6.2 mm and the ARE inner tube 4b has an outer diameter of 2.5 mm. The wall thickness of both structural elements (4a; 4b) is equal and is 0.3 mm. The lengths of ARE outer tube 4a and ARE inner tube 4b correspond to the cladding tube length 1.

The anti-resonance element preforms 4 are fixed to the inner wall of the cladding tube 1 by means of the bonding compound 5 based on SiO$_2$.

The bonding compound 5 is applied locally to the inner sheath surface of the cladding tube in the region of the face ends, and the anti-resonance element preforms are placed thereon using a positioning template with a structurally predetermined star-shaped arrangement of holding arms for the individual anti-resonance element preforms 4. In this case, the positioning template is limited to the region around the two face ends of the cladding tube.

This method creates a precise and reproducible connection between the cladding tube 1 and the anti-resonance element preforms 4. Solidification of the bonding compound 5 at a low temperature below 300° C. is sufficient for fixing, so that an intense heating of the surrounding regions and thus a deformation of anti-resonance element preforms 4 is avoided.

The primary preform 3 is collected with a collecting cylinder made of quartz glass, wherein the collecting cylinder collapses onto the cladding tube 1, and at the same time, the tube ensemble is elongated to form a secondary preform. The collecting cylinder has an outer diameter of 63.4 mm and a wall thickness of 17 mm.

In the collapse and elongation process, the coaxial arrangement of the cladding tube 1 and the collecting cylinder coming from below in a vertically oriented longitudinal axis is fed to a temperature-controlled heating zone and softens therein zone-by-zone starting with the upper end of the arrangement.

The heating zone is kept at a desired temperature of 1600° C. with a control accuracy of +/−0.1° C. Temperature fluctuations in the hot-forming process can thereby be limited to less than +1-0.5° C.

The secondary preform formed in the collapse and elongation process has an outer diameter of approximately 50 mm and a sheath wall thickness of 16.6 mm composed of an outer sheath and an inner sheath. The maximum wall thickness variation (greatest value minus smallest value) of the anti-resonance element preforms is less than 4 µm. The secondary preform is subsequently drawn into the anti-resonant hollow-core fiber.

The following table mentions the removal parameters at different outer diameters before (BEFORE) and after (AFTER) the forming process (collapsing the outer sheath and elongation).

TABLE 1

| Outer diameter BEFORE [mm] | Outer diameter AFTER [mm] | Cladding tube length [mm] | Feed rate [mm/min] | Removal [mm/min] |
|---|---|---|---|---|
| 90 | 70 | 1000 | 15 | 9.80 |
| 80 | 70 | 1000 | 15 | 4.59 |
| 40 | 20 | 1000 | 5 | 15 |
| 25 | 20 | 1000 | 10 | 5.63 |

The heating zone has a length of 100 mm. For example, a cladding tube having an outer diameter of 90 mm and a wall thickness of 10 mm at a feed rate of 5 mm/min results in a throughput of 27.6 g/min into the heating zone; at a feed rate of 15 mm/min, the throughput is 83 g/min. At the feed rates of 5 mm/min or 15 mm/min, throughputs of 0.8 g/min or 2.49 g/min result for a tube having an outer diameter of 25 mm and 1 mm wall thickness.

In the following table, the outer diameters (OD) or inner diameters (ID) of preforms and components thereof are summarized as a function of the desired diameter ratio (OD/ID) between the outer and inner diameters of the sheath region of the hollow-core fiber.

TABLE 2

| No. | OD/ID | Fiber OD/ID | OD (secondary preform (mm) | ID (former primary preform) (mm) | OD (former primary preform in the cane (mm) |
|---|---|---|---|---|---|
| 1 | 2.3 | 230/98 | 90 | 38 | 46 |
| 2 | 2.9 | 230/80 | 90 | 31 | 39 |
| 3 | 2.0 | 200/98 | 90 | 44 | 53 |
| 4 | 3.0 | 230/98 | 50 | 16.8 | 22.2 |
| 5 | 2.3 | 230/98 | 25 | 11 | 13 |
| 6 | 2.3 | 230/98 | 100 | 58 | 75 |
| 7 | 4.0 | 230/90 | 50 | 12.5 | 18.8 |

The value for OD/ID in table column 2 results from dividing the values of columns 4 (outer diameter of the secondary preform) and 5 (inner diameter of the former primary preform in the secondary preform).

The maximum deviation of the wall thickness of the anti-resonance element preforms in the preform is about 4 µm in all exemplary embodiments. Hollow-core fibers having outer diameters of 200 µm and 230 mm, respectively, were drawn from the preforms, as indicated in the table above, and the wall thicknesses of the anti-resonance elements were determined. Example no. 4 of the table corresponds to the exemplary embodiment described in detail above. Examples 5 and 6 are comparative examples. In the fiber-drawing process while using the preforms of the comparative examples, no hollow-core fibers with an optimal geometry were obtained. This is attributed to too large or too small a primary preform during the elongation process.

The invention claimed is:

1. A method for producing an anti-resonant hollow-core fiber having a hollow core extending along a longitudinal axis of the hollow-core fiber and an inner sheath surrounding the hollow core, which inner sheath includes a plurality of anti-resonance elements, the method comprising the steps of:
(a) providing a cladding tube having an inner bore and a longitudinal axis, along which a cladding tube wall delimited by an inner side and an outer side extends;
(b) providing a plurality of tubular anti-resonance element preforms;
(c) arranging the anti-resonance element preforms at desired positions of the inner side of the cladding tube wall to form a primary preform having an outer diameter in the range of 20 to 70 mm;
(d) further processing of the primary preform into a secondary preform from which the hollow-core fiber is drawn, wherein the further processing includes elongating the primary preform and a single or repeated performance of one or more of the following hot-forming processes:
    (i) collapsing additional sheath material,
    (ii) collapsing additional sheath material and simultaneously elongating the primary preform, and
(e) drawing the secondary preform to form the hollow-core fiber, wherein the secondary preform resulting from further processing of the primary preform according to step (d) has an outside diameter in the range of 20 to 70 mm,
further comprising fixing and/or sealing using a sealing or bonding compound containing amorphous $SiO_2$ particles to arrange the anti-resonance element preforms and/or elongate the primary preform and/or draw the hollow-core fiber, and
wherein open ends of the anti-resonance element preforms and/or individual structural elements of the anti-resonance element preforms and/or any annular gap between tube elements of the anti-resonance element preforms are sealed by the sealing or bonding compound when the primary preform is elongated and/or when the hollow-core fibers are drawn.

2. The method according to claim 1, further comprising, during the elongation of the primary preform, using a temperature-controlled heating element the temperature of which is kept precisely at +/−0.1° C.

3. The method according to claim 1, further comprising, during the elongation of the primary preform, feeding the primary preform to a heating zone at a feed rate set to yield a throughput of at least 0.8 g/min and an average dwell time in the heating zone of less than 25 min.

4. The method according to claim 1, wherein a draw-down ratio during the elongation of the primary preform is set to a value in the range of 1.05 to 10.

5. The method according to claim 1, further comprising machining the inner side of the cladding tube and/or the outer side of the cladding tube.

6. The method according to claim 1, further comprising machining at the desired positions to provide the inner side of the cladding tube with a longitudinal structure extending in the direction of the longitudinal axis of the cladding tube.

7. The method according to claim 1, wherein, when the anti-resonance element preforms are arranged at desired positions on the inside of the cladding tube wall, upper ends of the anti-resonance element preforms are positioned at the desired positions using a positioning template.

8. The method according to claim 7, wherein the cladding tube has a pair of end faces and the positioning template is used in the region of at least one of the end faces.

9. The method according to claim 3, wherein the feed rate is set to yield a throughput in the range from 0.8 g/min to 85 g/min.

10. The method according to claim 9, wherein the feed rate set to yield a throughput in the range from 3.3 g/min to 85 g/min.

11. The method according to claim 3, wherein the average dwell time is in the range of 5 to 25 min.

12. The method according to claim 4, wherein the draw-down ratio during the elongation of the primary preform is set to a value in the range of 1.05 to 5.

13. The method according to claim 5, wherein the step of machining includes drilling, milling, grinding, honing, and/or polishing.

14. The method according to claim 8, wherein the positioning template is used in the region of both of the end faces.

15. A method for producing a preform for an anti-resonant hollow-core fiber having a hollow core extending along a longitudinal axis of the hollow-core fiber and an inner sheath surrounding the hollow core, which inner sheath includes a plurality of anti-resonance elements, the method comprising the steps of:
(a) providing a cladding tube having an inner bore and a longitudinal axis, along which a cladding tube wall delimited by an inner side and an outer side extends;
(b) providing a plurality of tubular anti-resonance element preforms;
(c) arranging the anti-resonance element preforms at desired positions of the inner side of the cladding tube wall to form a primary preform having an outer diameter in the range of 20 to 70 mm; and
(d) further processing the primary preform into a secondary preform for the hollow-core fiber, wherein the further processing includes elongating the primary preform and
    (i) collapsing additional sheath material,
    (ii) collapsing additional sheath material and simultaneously elongating the primary preform such that the resulting secondary preform has an outside diameter in the range of 20 to 70 mm, further comprising fixing and/or sealing using a sealing or bonding compound containing amorphous $SiO_2$ particles to arrange the anti-resonance element preforms and/or elongate the primary preform and/or draw the hollow-core fiber, and
wherein open ends of the anti-resonance element preforms and/or individual structural elements of the anti-resonance element preforms and/or any annular gap between tube elements of the anti-resonance element preforms are sealed by the sealing or bonding compound when the primary preform is elongated and/or when the hollow-core fibers are drawn.

\* \* \* \* \*